US011412835B2

(12) United States Patent
Bartholomew et al.

(10) Patent No.: US 11,412,835 B2
(45) Date of Patent: Aug. 16, 2022

(54) AUTOMATED DELIVERY SYSTEM OF A COSMETIC SAMPLE

(71) Applicant: Cosmetic Technologies, LLC, West Bloomfield, MI (US)

(72) Inventors: Julie R. Bartholomew, Birmingham, MI (US); John Osborne, Southfield, MI (US); Ian Raber, Troy, MI (US); Jordan Ridenour, Troy, MI (US); Elizabeth Steenwyk, Hudsonville, MI (US)

(73) Assignee: Cosmetic Technologies, L.L.C., W, Bloomfield, MI (US)

( * ) Notice: Subject to any disclaimer, the term of this patent is extended or adjusted under 35 U.S.C. 154(b) by 0 days.

(21) Appl. No.: 15/580,996

(22) PCT Filed: Jun. 8, 2016

(86) PCT No.: PCT/US2016/036486
§ 371 (c)(1),
(2) Date: Dec. 8, 2017

(87) PCT Pub. No.: WO2016/200975
PCT Pub. Date: Dec. 15, 2016

(65) Prior Publication Data
US 2018/0206612 A1    Jul. 26, 2018

Related U.S. Application Data

(60) Provisional application No. 62/332,816, filed on May 6, 2016, provisional application No. 62/172,509, filed on Jun. 8, 2015.

(51) Int. Cl.
*A45D 40/00* (2006.01)
*A45D 44/00* (2006.01)
(Continued)

(52) U.S. Cl.
CPC ....... *A45D 40/0087* (2013.01); *A45D 19/012* (2021.01); *A45D 44/005* (2013.01);
(Continued)

(58) Field of Classification Search
CPC .......................... G07F 11/165; A45D 40/0087
See application file for complete search history.

(56) References Cited

U.S. PATENT DOCUMENTS

| 967,938 A | 8/1910 | Krause |
| 1,912,899 A | 6/1933 | Johannsen |

(Continued)

FOREIGN PATENT DOCUMENTS

| CA | 2400748 C | 10/2001 |
| CA | 98986 | 3/2003 |

(Continued)

OTHER PUBLICATIONS

US 6,568,560 B2, 05/2003, Bartholomew et al. (withdrawn)
(Continued)

*Primary Examiner* — Timothy R Waggoner
(74) *Attorney, Agent, or Firm* — The Dobrusin Law Firm, PC

(57) ABSTRACT

The present teachings contemplate a dispensing apparatus for cosmetic samples, the apparatus comprising a retail point of sale dispenser; a carrier including a plurality of mounts and a plurality of containers removably attached to the carrier via the plurality of mounts; with vertical and horizontal translational components; one or more information retrieval devices; a user interface including a data interface adapted to store information on the one or more information retrieval devices; a transparent panel covering at least a portion of the dispensing apparatus and wherein the one or more information retrieval device are adapted to be main-
(Continued)

tained in the possession of a user; and wherein the apparatus dispenses cosmetic samples based on user input.

17 Claims, 2 Drawing Sheets

(51) Int. Cl.
    *A45D 19/00*           (2006.01)
    *B01F 33/84*           (2022.01)
    *G05B 15/02*           (2006.01)
    *G07F 11/00*           (2006.01)
    *B01F 101/21*          (2022.01)

(52) U.S. Cl.
    CPC .......... *B01F 33/8442* (2022.01); *G05B 15/02* (2013.01); *G07F 11/007* (2013.01); *B01F 2101/21* (2022.01)

(56) References Cited

U.S. PATENT DOCUMENTS

| | | |
|---|---|---|
| D90,897 S | 10/1933 | Rockola |
| D96,564 S | 8/1935 | Simpkins |
| 2,393,371 A | 1/1946 | Harris |
| 2,417,677 A | 3/1947 | Cohan |
| D192,180 S | 2/1962 | Hodgman |
| D192,301 S | 2/1962 | Schaef |
| 3,024,583 A | 3/1962 | Gastright |
| 3,527,236 A | 9/1967 | Anthony et al. |
| 3,471,611 A | 10/1969 | Scott et al. |
| 3,598,284 A | 8/1971 | Wessely |
| 3,688,947 A | 9/1972 | Reichenberger |
| 3,692,027 A | 9/1972 | Ellinwood, Jr. |
| 3,860,015 A | 1/1975 | Tarro |
| 3,994,480 A | 11/1976 | Fothergill et al. |
| 4,003,379 A | 1/1977 | Ellinwood, Jr. |
| D248,693 S | 7/1978 | Housman |
| 4,133,525 A | 1/1979 | Bailes et al. |
| 4,146,029 A | 3/1979 | Ellinwood, Jr. |
| 4,160,271 A | 7/1979 | Grayson et al. |
| 4,176,762 A | 12/1979 | Era et al. |
| 4,204,563 A | 5/1980 | Pyle |
| 4,271,192 A | 6/1981 | Wurtman et al. |
| 4,281,664 A | 8/1981 | Duggan |
| 4,299,220 A | 11/1981 | Dorman |
| 4,351,591 A | 9/1982 | Stockett |
| 4,434,467 A | 2/1984 | Scott |
| 4,461,401 A | 7/1984 | Sasnett, Jr. |
| 4,470,987 A | 9/1984 | Wurtman et al. |
| 4,544,371 A | 10/1985 | Dormandy, Jr. et al. |
| 4,556,063 A | 12/1985 | Thompson et al. |
| 4,561,850 A | 12/1985 | Fabbri et al. |
| 4,628,974 A | 12/1986 | Meyer et al. |
| 4,651,716 A | 3/1987 | Forester et al. |
| 4,674,518 A | 6/1987 | Salo |
| 4,681,546 A | 7/1987 | Hart |
| 4,686,987 A | 8/1987 | Salo et al. |
| 4,705,083 A | 11/1987 | Rossetti |
| 4,720,025 A | 1/1988 | Tatevosian et al. |
| 4,764,044 A | 8/1988 | Konose |
| 4,830,218 A | 5/1989 | Shirkan |
| 4,838,457 A | 6/1989 | Swahl et al. |
| 4,846,184 A | 7/1989 | Comment et al. |
| 4,871,262 A | 10/1989 | Krauss et al. |
| 4,887,410 A | 12/1989 | Gandini |
| 4,897,987 A | 2/1990 | Spalla |
| D306,808 S | 3/1990 | Thomas |
| 4,909,632 A | 3/1990 | McFarlane |
| 4,944,299 A | 7/1990 | Silvian |
| 4,947,903 A | 8/1990 | Beckwith |
| 4,953,985 A | 9/1990 | Miller |
| 4,966,205 A | 10/1990 | Tanaka |
| 4,967,938 A | 11/1990 | Hellenberg |
| 5,014,698 A | 5/1991 | Cohen |
| 5,028,142 A | 7/1991 | Ostoich et al. |
| 5,040,533 A | 8/1991 | Fearnot |
| 5,041,107 A | 8/1991 | Heil, Jr. |
| 5,042,497 A | 8/1991 | Shapland |
| 5,042,691 A | 8/1991 | Maldonado |
| 5,044,520 A | 9/1991 | Moisan |
| 5,058,581 A | 10/1991 | Silvian |
| D322,542 S | 12/1991 | Fontlladosa |
| 5,078,302 A | 1/1992 | Hellenberg |
| 5,083,591 A | 1/1992 | Edwards et al. |
| 5,111,855 A | 5/1992 | Boeck et al. |
| 5,116,134 A | 5/1992 | Edwards et al. |
| 5,119,973 A | 6/1992 | Miller et al. |
| D327,695 S | 7/1992 | Edstrom |
| D327,895 S | 7/1992 | Edstrom |
| 5,137,367 A | 8/1992 | Madonia et al. |
| 5,163,010 A | 11/1992 | Klein et al. |
| 5,163,484 A | 11/1992 | Howlett et al. |
| 5,193,720 A | 3/1993 | Mayberry |
| 5,197,802 A | 3/1993 | Miller et al. |
| 5,203,387 A | 4/1993 | Howlett et al. |
| 5,267,178 A | 11/1993 | Berner |
| 5,267,669 A | 12/1993 | Dixon et al. |
| 5,268,620 A | 12/1993 | Hellenberg |
| 5,268,849 A | 12/1993 | Howlett et al. |
| 5,271,527 A | 12/1993 | Haber et al. |
| 5,271,628 A | 12/1993 | Okada |
| 5,305,917 A | 4/1994 | Miller et al. |
| 5,310,257 A | 5/1994 | Altieri, Jr. et al. |
| 5,311,293 A | 5/1994 | MacFarlane et al. |
| 5,312,240 A | 5/1994 | Divone, Sr. et al. |
| 5,313,267 A | 5/1994 | MacFarlane et al. |
| D347,645 S | 6/1994 | Miller |
| D347,646 S | 6/1994 | Mayberry |
| 5,328,057 A | 7/1994 | Hellenberg et al. |
| D349,506 S | 8/1994 | Caruso et al. |
| 5,356,041 A | 10/1994 | Hellenberg |
| 5,361,812 A | 11/1994 | Ameson et al. |
| 5,368,196 A | 11/1994 | Hellenberg et al. |
| 5,379,916 A | 1/1995 | Martindale et al. |
| 5,397,134 A | 3/1995 | Fishman et al. |
| D357,142 S | 4/1995 | Jones et al. |
| 5,407,100 A | 4/1995 | Tracy et al. |
| 5,460,297 A | 10/1995 | Shannon et al. |
| 5,478,238 A | 12/1995 | Gourtou et al. |
| D366,304 S | 1/1996 | Lewis |
| 5,480,288 A | 1/1996 | Hellenberg et al. |
| 5,495,338 A | 2/1996 | Gouriou et al. |
| 5,507,575 A | 4/1996 | Rossetti |
| 5,524,656 A | 6/1996 | Konarski et al. |
| 5,531,710 A | 7/1996 | Dang et al. |
| 5,537,211 A | 7/1996 | Dial |
| 5,549,372 A | 8/1996 | Lewis |
| D374,677 S | 10/1996 | Hodson et al. |
| 5,562,109 A | 10/1996 | Tobiason |
| 5,562,643 A | 10/1996 | Johnson |
| 5,566,693 A | 10/1996 | Gunderman et al. |
| 5,612,868 A | 3/1997 | Off et al. |
| 5,622,692 A | 4/1997 | Rigg et al. |
| 5,626,155 A | 5/1997 | Saute |
| 5,626,260 A | 5/1997 | Waldner |
| 5,629,981 A | 5/1997 | Nerlikar |
| 5,632,314 A | 5/1997 | Koppe et al. |
| 5,636,637 A | 6/1997 | Guiolet et al. |
| 5,643,341 A | 7/1997 | Hirsch et al. |
| 5,647,411 A | 7/1997 | Koppe et al. |
| 5,668,633 A | 9/1997 | Cheetam et al. |
| 5,687,322 A | 11/1997 | Deaton et al. |
| 5,690,252 A | 11/1997 | Oleksiewicz et al. |
| 5,692,291 A | 12/1997 | Deevi et al. |
| 5,697,527 A | 12/1997 | Altieri, Jr. et al. |
| 5,711,458 A | 1/1998 | Langeveld et al. |
| 5,711,601 A | 1/1998 | Thomas et al. |
| 5,715,314 A | 2/1998 | Payne et al. |
| 5,716,150 A | 2/1998 | Gueret |
| 5,717,750 A | 2/1998 | Adams, Jr. et al. |
| 5,720,017 A | 2/1998 | Cheetam et al. |
| 5,724,424 A | 3/1998 | Gifford |
| 5,730,330 A | 3/1998 | Reading |

(56) References Cited

U.S. PATENT DOCUMENTS

| | | |
|---|---|---|
| D393,150 S | 4/1998 | Swanston et al. |
| 5,771,524 A | 6/1998 | Woods et al. |
| 5,778,901 A | 7/1998 | Abrahamian |
| 5,785,510 A | 7/1998 | Altieri, Jr. et al. |
| 5,785,960 A | 7/1998 | Rigg et al. |
| 5,797,750 A | 8/1998 | Gouriou et al. |
| 5,813,420 A | 9/1998 | Sussman |
| D401,246 S | 11/1998 | Langeveld et al. |
| 5,841,421 A | 11/1998 | Cheetam et al. |
| 5,842,641 A | 12/1998 | Mazzalveri |
| 5,860,809 A | 1/1999 | Meehan |
| 5,862,947 A | 1/1999 | Wiegner et al. |
| 5,867,403 A | 2/1999 | Sasnett et al. |
| 5,897,204 A | 4/1999 | Dittmer et al. |
| 5,903,465 A | 5/1999 | Brown |
| 5,904,421 A | 5/1999 | Mazzalveri |
| 5,906,433 A | 5/1999 | Mazzalveri |
| 5,924,426 A | 7/1999 | Galazin |
| 5,931,166 A | 8/1999 | Weber et al. |
| 5,933,792 A | 8/1999 | Anderson et al. |
| 5,938,080 A | 8/1999 | Haaser et al. |
| 5,944,227 A | 8/1999 | Schroeder et al. |
| 5,945,112 A | 8/1999 | Flynn et al. |
| 5,960,411 A | 9/1999 | Hartman et al. |
| 5,971,351 A | 10/1999 | Swaab |
| 5,972,322 A | 10/1999 | Rath et al. |
| 5,982,501 A | 11/1999 | Benz et al. |
| 5,984,146 A | 11/1999 | Kaufman |
| 5,992,691 A | 11/1999 | Post et al. |
| 5,993,792 A | 11/1999 | Rath et al. |
| 6,000,407 A | 12/1999 | Galazin |
| 6,002,488 A | 12/1999 | Berg et al. |
| 6,003,731 A | 12/1999 | Post et al. |
| 6,021,362 A | 2/2000 | Maggard et al. |
| 6,035,860 A | 3/2000 | Mombourquette |
| 6,035,867 A | 3/2000 | Barrick |
| 6,039,487 A * | 3/2000 | Kristiansen ............ A46B 7/04 401/126 |
| 6,056,158 A | 5/2000 | Rossetti et al. |
| 6,065,969 A | 5/2000 | Rifkin et al. |
| 6,073,834 A | 6/2000 | Michael et al. |
| 6,086,471 A | 7/2000 | Zimmermann |
| 6,089,538 A | 7/2000 | Shirkhan |
| 6,095,677 A | 8/2000 | Karkos et al. |
| 6,119,895 A | 9/2000 | Fugere et al. |
| 6,121,878 A | 9/2000 | Brady et al. |
| 6,139,429 A | 10/2000 | Shoemaker, Jr. |
| 6,158,997 A | 12/2000 | Post |
| 6,172,596 B1 | 1/2001 | Cesar et al. |
| 6,177,093 B1 | 1/2001 | Lombardi et al. |
| D437,151 S | 2/2001 | Gerstmar |
| 6,182,555 B1 | 2/2001 | Scheer et al. |
| 6,186,686 B1 | 2/2001 | Neuner et al. |
| 6,198,536 B1 | 3/2001 | Baker |
| 6,200,210 B1 | 3/2001 | Pratt |
| 6,202,895 B1 | 3/2001 | Fox |
| D442,405 S | 5/2001 | Gerstmar |
| 6,264,786 B1 | 7/2001 | Cromett |
| 6,267,970 B1 | 7/2001 | Matesevac et al. |
| 6,270,273 B1 | 8/2001 | Ohba |
| 6,273,298 B1 | 8/2001 | Post |
| 6,284,228 B1 | 9/2001 | Markowitz |
| 6,293,284 B1 | 9/2001 | Rigg |
| 6,297,420 B1 | 10/2001 | Heincke |
| 6,318,596 B1 | 11/2001 | Wiesner |
| 6,338,030 B1 | 1/2002 | Senn et al. |
| 6,338,349 B1 | 1/2002 | Robinson et al. |
| 6,371,129 B1 | 4/2002 | Le Bras-Brown et al. |
| 6,382,269 B1 | 5/2002 | Tatsuno |
| 6,383,542 B1 | 5/2002 | Khodor et al. |
| 6,398,513 B1 | 6/2002 | Amsler et al. |
| 6,402,120 B1 | 6/2002 | Swaab |
| 6,412,658 B1 | 7/2002 | Bartholomew et al. |
| D461,080 S | 8/2002 | Bartholomew et al. |
| 6,437,866 B1 | 8/2002 | Flynn |
| D465,810 S | 11/2002 | Bartholomew et al. |
| 6,510,366 B1 | 1/2003 | Murray et al. |
| 6,516,245 B1 | 2/2003 | Dirksing et al. |
| 6,557,369 B1 | 5/2003 | Phelps et al. |
| 6,568,575 B1 | 5/2003 | Bartholomew et al. |
| 6,588,085 B2 | 7/2003 | Holloway |
| 6,603,550 B1 | 8/2003 | Flynn |
| 6,607,100 B2 | 8/2003 | Phelps et al. |
| 6,615,881 B2 | 9/2003 | Bartholomew et al. |
| 6,622,064 B2 | 9/2003 | Bartholomew et al. |
| 6,663,818 B2 | 12/2003 | Statham et al. |
| D485,310 S | 1/2004 | Bartholomew et al. |
| 6,672,341 B2 | 1/2004 | Bartholomew et al. |
| 6,728,307 B1 | 4/2004 | Derryberry et al. |
| 6,779,686 B2 | 8/2004 | Bartholomew et al. |
| 6,782,307 B2 | 8/2004 | Wilmott et al. |
| D500,804 S | 1/2005 | Jobe et al. |
| 6,883,561 B2 | 4/2005 | Bartholomew |
| 6,935,386 B2 | 8/2005 | Millet et al. |
| D513,040 S | 12/2005 | Bartholomew et al. |
| 7,082,970 B2 | 8/2006 | Bartholomew et al. |
| 7,099,740 B2 | 8/2006 | Bartholomew et al. |
| 7,121,429 B2 | 10/2006 | Bartholomew et al. |
| 7,134,573 B2 | 11/2006 | Post |
| 7,174,310 B2 | 2/2007 | Bartholomew et al. |
| 7,206,664 B2 | 4/2007 | Schmid |
| 7,395,134 B2 | 7/2008 | Bartholomew et al. |
| 7,445,372 B1 | 11/2008 | Engel et al. |
| 7,475,710 B2 | 1/2009 | Bartholomew et al. |
| 7,624,769 B2 | 12/2009 | Bartholomew |
| 7,822,504 B2 | 10/2010 | Bartholomew et al. |
| 8,017,137 B2 | 9/2011 | Bartholomew et al. |
| 8,141,596 B2 | 3/2012 | Bartholomew et al. |
| 8,186,872 B2 | 5/2012 | Bartholomew et al. |
| 8,351,038 B2 | 1/2013 | Carrol et al. |
| 8,352,070 B2 | 1/2013 | Bartholomew et al. |
| 8,564,778 B1 | 10/2013 | Igarashi |
| 8,573,263 B2 | 11/2013 | Bartholomew et al. |
| 8,593,634 B1 | 11/2013 | Igarashi |
| 8,608,371 B2 | 12/2013 | Bartholomew et al. |
| 8,636,173 B2 | 1/2014 | Bartholomew |
| 8,880,218 B2 | 11/2014 | Bartholomew |
| 8,960,994 B2 | 2/2015 | Schwartz |
| 9,218,813 B2 | 12/2015 | Baldwin et al. |
| 9,691,213 B2 | 6/2017 | Bartholomew et al. |
| 2001/0000802 A1 | 5/2001 | Soykan et al. |
| 2001/0044579 A1 | 11/2001 | Pratt |
| 2001/0047309 A1* | 11/2001 | Bartholomew .... G06Q 30/0641 700/233 |
| 2002/0010528 A1 | 1/2002 | Bartholomew et al. |
| 2002/0026228 A1 | 2/2002 | Schauerte |
| 2002/0084288 A1 | 7/2002 | Lewis et al. |
| 2002/0109270 A1 | 8/2002 | Swaab |
| 2002/0131985 A1 | 9/2002 | Shana'a et al. |
| 2002/0136700 A1 | 9/2002 | Margosiak et al. |
| 2002/0179639 A1 | 12/2002 | Bartholomew |
| 2003/0014324 A1 | 1/2003 | Donovan et al. |
| 2003/0060854 A1 | 3/2003 | Zhu |
| 2003/0060925 A1 | 3/2003 | Bartholomew et al. |
| 2003/0062379 A1 | 4/2003 | Bartholomew et al. |
| 2003/0066096 A1 | 4/2003 | Bryan |
| 2003/0090176 A1 | 5/2003 | Bartholomew et al. |
| 2003/0098314 A1 | 5/2003 | Phelps et al. |
| 2003/0151611 A1 | 8/2003 | Turpin et al. |
| 2004/0002739 A1 | 1/2004 | Cates et al. |
| 2004/0004309 A1 | 1/2004 | Sears |
| 2004/0122553 A1 | 6/2004 | Phan et al. |
| 2004/0143367 A1 | 7/2004 | Bartholomew et al. |
| 2004/0243361 A1 | 12/2004 | Steuben et al. |
| 2004/0245263 A1 | 12/2004 | Bartholomew et al. |
| 2006/0024342 A1 | 2/2006 | Bartholomew et al. |
| 2006/0043111 A1 | 3/2006 | Jennings et al. |
| 2006/0124196 A1* | 6/2006 | Bartholomew ........ G07F 11/165 141/100 |
| 2006/0283521 A1 | 12/2006 | Bartholomew et al. |
| 2007/0194038 A1 | 8/2007 | Bartholomew et al. |
| 2008/0047972 A1 | 2/2008 | Bartholomew et al. |
| 2008/0063562 A1 | 3/2008 | Hoover et al. |
| 2008/0311061 A1 | 12/2008 | Heuer |

(56) References Cited

U.S. PATENT DOCUMENTS

| | | |
|---|---|---|
| 2009/0210322 A1 | 8/2009 | Stark |
| 2010/0148931 A1 | 6/2010 | Pappu et al. |
| 2011/0226803 A1 | 9/2011 | Schwartz |
| 2012/0067364 A1* | 3/2012 | Wong .................. A45D 44/005 132/200 |
| 2013/0123973 A1 | 5/2013 | Saranow et al. |
| 2013/0338821 A1 | 12/2013 | Igarashi |
| 2014/0066721 A1 | 3/2014 | Dillard |
| 2014/0081462 A1 | 3/2014 | Igarashi |
| 2014/0081463 A1 | 3/2014 | Igarashi |
| 2014/0277704 A1* | 9/2014 | Memar ............... B01F 13/1063 700/233 |
| 2014/0311625 A1 | 10/2014 | Bartholomew et al. |
| 2015/0144652 A1* | 5/2015 | Kline .................. B67D 1/0888 222/1 |
| 2017/0282139 A1 | 10/2017 | Bartholomew et al. |

FOREIGN PATENT DOCUMENTS

| | | |
|---|---|---|
| CA | 2461307 A1 | 4/2003 |
| CA | 2574486 A1 | 2/2006 |
| CA | 2587098 A1 | 5/2006 |
| CN | 101111870 B | 1/2013 |
| CN | 103198270 B | 3/2016 |
| DE | 41 10 299 C1 | 2/1993 |
| DE | 40202765.5 | 3/2002 |
| DE | 102009040514 A1 | 3/2011 |
| EP | 0 443 741 B1 | 8/1991 |
| EP | 0 446 512 B1 | 1/1995 |
| EP | 0 682 236 B1 | 11/1995 |
| EP | 0 686 997 A2 | 12/1995 |
| EP | 0871022 | 10/1998 |
| EP | 1093842 | 4/2001 |
| EP | 3002418 | 2/2003 |
| EP | 1 431 890 A1 | 6/2004 |
| EP | 1429640 | 3/2007 |
| EP | 1297409 | 5/2008 |
| EP | 2000089 A1 | 12/2008 |
| EP | 2343692 A1 | 7/2011 |
| EP | 1834309 | 10/2013 |
| EP | 2974124 A1 | 1/2016 |
| FR | 021986 | 3/2002 |
| GB | 3002418 | 3/2002 |
| GB | 2431577 | 5/2007 |
| GR | 3062096 | 6/2007 |
| HK | 1069746 A1 | 10/2007 |
| HK | 1056620 A1 | 1/2009 |
| HK | 1117623 A1 | 9/2013 |
| HK | 1187141 A1 | 5/2017 |
| JP | 04-231006 | 8/1992 |
| JP | 05-025020 | 2/1993 |
| JP | 05-107115 | 4/1993 |
| JP | 05-233651 | 9/1993 |
| JP | 07-243908 | 9/1995 |
| JP | 07-270396 | 10/1995 |
| JP | 08-050125 | 2/1996 |
| JP | 08-280633 | 10/1996 |
| JP | 09-10033 | 1/1997 |
| JP | 09-038045 | 2/1997 |
| JP | 09-133584 | 5/1997 |
| JP | 09-178560 | 7/1997 |
| JP | 10-339670 | 12/1998 |
| JP | 11-169231 | 6/1999 |
| JP | 11-218447 | 8/1999 |
| JP | 11-265443 | 9/1999 |
| JP | 2001-126140 | 5/2001 |
| JP | 11-66435 | 1/2003 |
| JP | 2003/252721 A | 9/2003 |
| JP | 2005503856 A | 2/2005 |
| JP | 2008532100 A | 8/2008 |
| JP | 4231407 B2 | 12/2008 |
| JP | 4699473 B2 | 3/2011 |
| JP | 5196695 B2 | 2/2013 |
| JP | 5514289 B2 | 4/2014 |
| SU | 1704759 | 1/1992 |
| WO | 95/05892 | 3/1995 |
| WO | 98/05417 | 2/1998 |
| WO | 98/30189 | 7/1998 |
| WO | 98/34905 | 7/1999 |
| WO | 00/64570 | 11/1999 |
| WO | 99/61234 | 12/1999 |
| WO | 01/12239 | 2/2001 |
| WO | 01/09777 | 3/2001 |
| WO | 01/91601 | 6/2001 |
| WO | 01/75586 | 10/2001 |
| WO | 01/91600 | 12/2001 |
| WO | 02/05200 A2 | 1/2002 |
| WO | 03/026458 | 4/2003 |
| WO | 2006/020189 | 2/2006 |
| WO | 2006/052863 | 5/2006 |
| WO | 2014/006721 A2 | 5/2014 |
| WO | 2014/066721 A2 | 5/2014 |

OTHER PUBLICATIONS

Extended European Search Report dated Nov. 29, 2018, Application No. 16808208.9.
International Search Report and Written Opinion, Application No. PCT/US2016/036486 dated Nov. 3, 2016.
Website at www.immedia.it—"Coty Introduces Jovan Individuality" pp. 1-3 (accessed Jun. 8, 2001).
Website at www.fast-fluid.com—"TiNTiA (hair dye dispenser" p. 2 (accessed May 18, 2004).
Evans, "An Introduction to Color", John Wiley & Sons, Inc, New York, 1948, pp. 87-90.
Lovett, P.A., et al., "Measurement of the Skin Colour of Babies in Hospital," National Lighting Conference 1986, pp. 140-154.
"The Shades of You; Your Color Palette," "Your New Image Through Color & Line", California Fashion Image, Crown Summit Books, 1981, pp.
Shibatani, J., et al., "Measurements of Aging Effects of Facial Color Distribution and Applications," J. Soc. Cosmet. Chem. Japan, vol. 19 No. 1, 1985, pp. 48-52.
Website at www.idexcorp.com/groups/fluidmgt.asp—"Fluid Management" pp. 1-2 (accessed May 18, 2004).
Supplementary European Search Report, Application No. 01 92 2731 dated Apr. 6, 2004.
International Search Report, Application No. PCT/US02/29515 dated May 23, 2003.
International Search Report PCT/US2005/025384 dated Mar. 29, 2006.
International Search and Written Opinion for PCT/US2005/040240 dated Apr. 3, 2006.
EP Office Action for Serial No. 01 922 731.3-2307, dated Jun. 17, 2005.
EP Office Action for Serial No. 02 763 648.9-2313, Applicant dated Jun. 6, 2005.
Extended EP Search Report for EP2000089A1 dated Nov. 11, 2008.
Website at www.reflect.com dated Jan. 25, 2002.
Website at www.threecustom.com dated Jan. 25, 2002.
Website at www.cololrab-cosmetics.com dated Jan. 25, 2002.
Pamphlet of Jovan, "Express your individuality" dated Jan. 25, 2002.
Website at www.cpcpkg.com dated Feb. 17, 2003.
Information from www.cosmetics.com/custblnd.htm dated Oct. 1, 2000.
Wyszecki et al., "Color Science; Conceps and Methods, Quantitative Data and Formulae", 2Edition, A. Wiley Intescience Publication p. 63, dated Aug. 2000.
Cheskin, L. "Color Guide for Marketing Media", The MacMillan Co., pp. 133-140 dated 1954.
International Search Report, Application No. PCT/US2013/66744, filed May 6, 2014.
PCT Application No. PCT/US2013/66744, published as WO2014/066721 on May 1, 2014.
European Search Report, EP Application No. 10 01 5814.6, dated Jun. 6, 2011.

(56) References Cited

OTHER PUBLICATIONS

Japanese Office Action dated Feb. 26, 2021, Application No. 2018-516388.
Japanese Notification for Refusal dated May 29, 2020, Application No. JP2018-516388.
Extended European Search Report dated Dec. 6, 2021, Application No. 21186779.1.
Chinese Notification of Granting Patent Right of Invention dated Oct. 18, 2022, Application No. 201680033816.1.

* cited by examiner

AUTOMATED DELIVERY SYSTEM OF A COSMETIC SAMPLE

CLAIM OF PRIORITY

The present application is a national phase filing of serial number PCT/US2016/036486 filed on Jun. 8, 2016 which claims the benefit of provisional application 62/172,509 filed on Jun. 8, 2015 and provisional application 62/332,816 filed on May 6, 2016, the entirety of the contents of each application being hereby incorporated by reference for all purposes.

FIELD

The present teachings relate to devices for an automated delivery system of a hygienic cosmetic sample.

BACKGROUND

Consumers wishing to purchase cosmetics may encounter cosmetics which are prepackaged and unavailable for sampling or cosmetics which are open and available to the general public for sampling. Prepackaged cosmetics do not provide consumers with customizable cosmetic samples or allow for consumer cosmetic sampling before purchase. Open cosmetic samples may be handled and/or applied by many people. Multiple individuals may directly apply the cosmetic samples to their face and/or hand, thereby posing health risks such as infections. Thus, consumers are faced with the decision to purchase cosmetics based on the closed cosmetic package or sampling open cosmetics which may have been displayed and handled in a potentially unhygienic manner.

Certain types of cosmetics such as lip gloss, concealer and mascara, which include cosmetic applicators or foundation may pose additional sampling problems. For example, lip gloss, concealer and mascara are frequently enclosed in product bottles including a cap with an attached cosmetic applicator, such as a brush applicator. Due to a lack of additional applicators, customers may lack a sanitary means to sample such cosmetics.

Prepackaged and open sample cosmetics also may not provide sample size cosmetics for consumer sampling. Furthermore, open sample cosmetics may have been on display for an uncertain length of time. Therefore, it may not be clear as to when an open cosmetic sample should be thrown away and replaced. In addition, the appearance (e.g. color and texture) and shelf life of the open sample cosmetics may be affected by frequent handling and/or improper storage. Therefore, the consumer may not be able to accurately determine whether a particular cosmetic is a suitable choice for purchase.

A customizable cosmetic dispenser relating to a nail polish color selection systemic is disclosed in U.S. Pat. No. 6,622,064 and incorporated by reference by herein. An apparatus relating to dispensing a custom cosmetic formulation is disclosed in U.S. Pat. No. 7,624,769 and incorporated by reference by herein. These cosmetic dispensers may suffer from one or more of the following disadvantages: may not dispense a sample size cosmetic, are limited or suitable for dispensing only one type of cosmetic, are limited to dispensing only customizable cosmetic formulations and require a mixing apparatus.

Thus, there is a need to give customers an opportunity to sample a cosmetic product before purchase that is hygienic. There is a need to give customers an opportunity to sample a cosmetic product before purchase that customizable. There is a need to give customers an opportunity to sample a cosmetic product before purchase that is size appropriate. There is a need to give customers an opportunity to sample a cosmetic product before purchase wherein the cosmetic sample is not handled by other people. There is also need for a cosmetic sample dispensing apparatus which offers one or more of the following benefits: dispenses a sample size cosmetic, is suitable for dispensing multiple types of cosmetics (e.g. lip gloss, concealer, and mascara), is not limited to dispensing only customizable cosmetic formulations and does not require a mixing apparatus. The present teachings provide one or more of the aforementioned opportunities/benefits.

SUMMARY

The present teachings contemplate an apparatus comprising a carrier including a plurality of mounts, a plurality of containers removably attached to the carrier via the plurality of mounts, vertical and horizontal translational components, one or more information retrieval devices, a user interface including a data interface adapted to store information on the one or more information retrieval devices and a transparent panel covering at least a portion of the dispensing apparatus. The one or more information retrieval device are adapted to be maintained in the possession of a user. The apparatus dispenses cosmetic samples based on user input.

The vertical and horizontal translational components may be comprised of a robotic arm assembly. The vertical and horizontal translational components may be comprised of a robotic arm assembly including one or more arm assemblies. The vertical and horizontal translational components may be comprised of a robotic arm assembly including three arm assemblies. The vertical and horizontal translational components may include an arm assembly including a motor, a drive member, a sliding member and an arm. The vertical and horizontal translational components may include an arm assembly including a motor, a drive member, a sliding member with a gripping portion and an arm. The vertical and horizontal translational components may include a first arm assembly and a second arm assembly including a motor, drive member, sliding member and an arm and a third arm assembly including a motor, drive member, sliding member with gripping portion and an arm.

The vertical and horizontal translational components may include a robotic arm assembly in which at least a portion of the robotic arm assembly moves along one or more axis. The vertical and horizontal translational components may include a robotic arm assembly with three arm assemblies in which at least a portion of the robotic arm assembly moves along the x-axis, the y-axis and the z-axis.

The carrier may be partially connected to a platform. The carrier may include one more panels. The carrier may be substantially rectangular in shape. The plurality of mounts may be arranged in one or more rows and/or columns. The container may include a bottle portion and a cap portion. The apparatus may include a plurality of caps with attached cosmetic applicators removably attached to the carrier via the plurality of mounts. The apparatus may include a plurality of caps with attached cosmetic applicators removably attached to the carrier via the plurality of mounts, wherein the attached cosmetic applicators include mascara brushes and lip gloss/concealer applicators. The apparatus may include a plurality of caps with attached cosmetic applicators removably attached to the carrier via the plurality of mounts, wherein the caps with attached cosmetic applicators are adapted to fit with a gripping portion of a robotic arm assembly. The apparatus may include a control housing assembly including electrical components and computer components. The apparatus may include a control housing assembly including electrical components and computer components connected to a robotic arm assembly.

DETAILED DESCRIPTION

Figure 1:
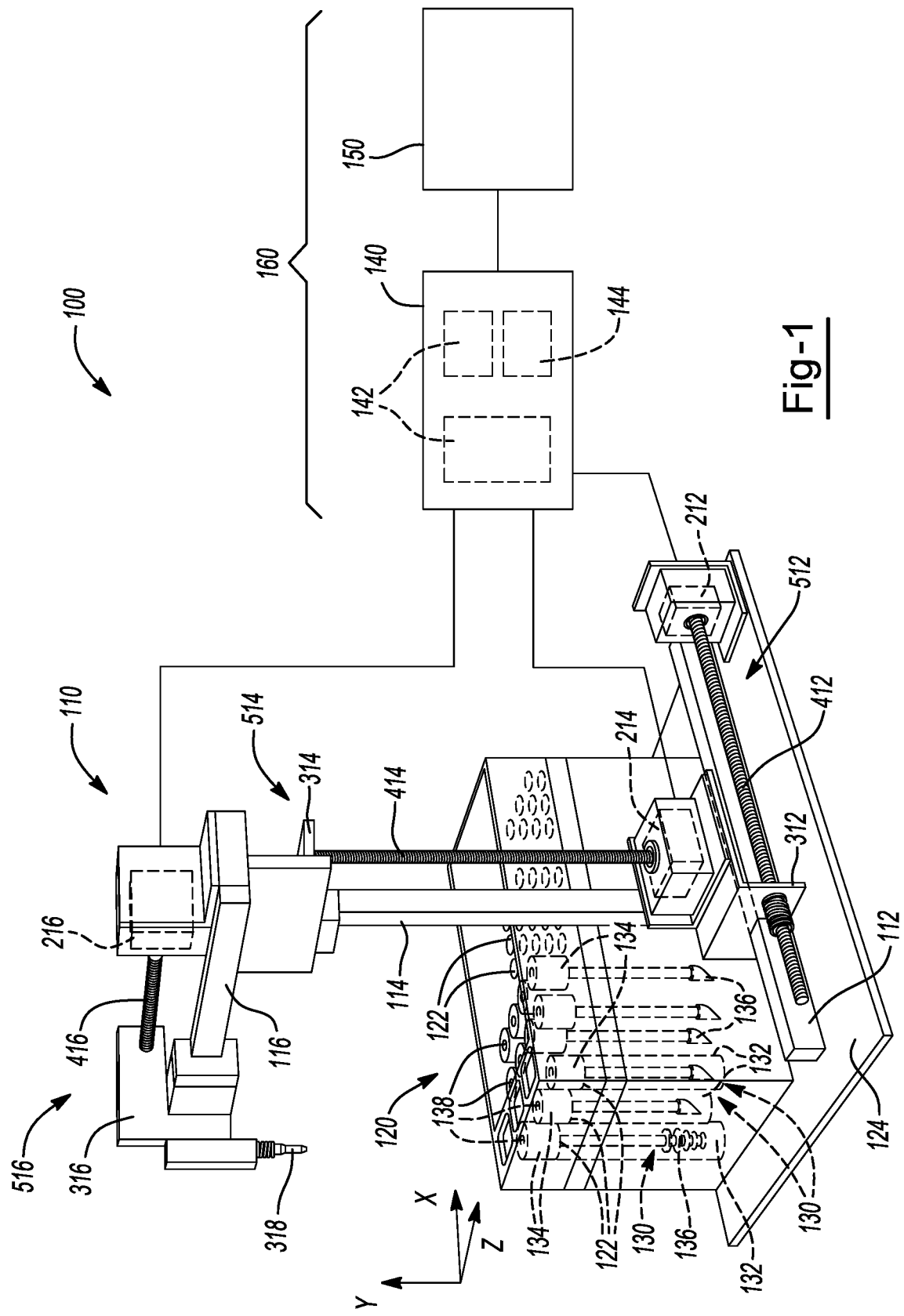
FIG. 1 and FIG. 2 illustrate a perspective view of an exemplary apparatus in accordance with the present teachings.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings contemplate a dispensing apparatus for cosmetic samples. The apparatus may be a retail point of sale dispenser. The apparatus may include a carrier including a plurality of mounts. The plurality of mounts may include a plurality of ingredient or cosmetic containers removably attached to the carrier via the plurality of mounts. The apparatus may include vertical and horizontal translational components. The apparatus may include one or more information retrieval devices. The apparatus may include a user interface including a data interface adapted to store information on the one or more information retrieval devices. The apparatus may include a transparent panel covering at least a portion of the dispensing apparatus. The one or more information retrieval device may be adapted to be maintained in the possession of a user.

In addition, the present teachings provide individuals with an opportunity to have sample sized cosmetic products dispensed on demand, personalized to a specific individual. For example, based on an individual's skin type, coloration, hydration level and the like. Furthermore, the present teachings provide for hygienic cosmetic samples which may be delivered upon request via mobile device, wearable technology, biometrics, and the like as a single dosage or sample size. The automated delivery system of hygienic cosmetic samples may be for personal use either at point of sale or for in home use.

The automated delivery system of hygienic cosmetic sample may be housed within an adjacent and independent automated, custom cosmetic dispenser. The automated delivery system of hygienic cosmetic sample may be housed within a retail gondola and operated by a mobile app to deliver a sample.

The location of sample dispenser technology (automated delivery system) may vary. The location may be at point of sale, for example, department stores, grocery stores, beauty retailers, and upscale discount retailers. The location within the aforementioned sites may be at one or more of the following: counter, cash wrap, wall, floor, ceiling, freestanding, gondola, portable device that can be carried, and in connection with a free-standing automated cosmetic dispenser that customizes a cosmetic product for purchase. The location of sample dispenser technology (automated delivery system) may be at home. Within the home, the location may be free-standing (portable), on a counter top, or built into a wall. The location of sample dispenser technology (automated delivery system) may be a car. Within a car, the location may be free-standing (portable), within seating or within a console.

The communication to sample dispenser technology (automated delivery system) may be any of the following: wearable technology, mobile device (app), thumb print recognition, facial recognition (biometrics), RFID, location technologies such as beacon, geometric, and the like, one or more photographs taken at delivery system, and one or more photographs uploaded to the dispenser from a computer or mobile device.

The type of hygienic sample dispensed may be a customized sample. The customized sample may be a combination of proportioned material (liquid, powder, or combination thereof). The proportioned material may be mixed/combined together manually and/or by an automated process to create a finished product for testing/sampling. The finished product may be tested/sampled for appearance, texture, taste, color, and the like for purchase at point of sale (POS) or for application at home, car, and/or other personal use.

The type of hygienic sample dispensed may be a sample of a finished or completed product for purchase or use. The dispensed sample may be one proportioned substance delivered to a substrate for testing/sampling. The dispensed sample may be used to determine quality and preference for product by appearance, texture, taste, color, and the like for purchase at POS or for application at home, car, and/or other personal use.

The substances to be dispensed may be liquids, solids or powders. The substances to be dispensed may be liquids. The substances to be dispensed may include one or more of the following: cosmetic products, foundation, perfume, mascara, lip gloss, liquid lip stick, eye gel, cheek gel, cosmetic color stain, skin care products, cleanser, lotion, tooth paste, mouth wash, hand sanitizer, hair gel, hair styling foam, sunscreen, after shave, shaving cream and deodorant. The substances to be dispensed may be solids, such as balms, lipstick and candle wax. The substances to be dispensed may be powders such as body powder, deodorant, eye shadows, blush, bronzers and dry shampoo.

The apparatus may dispense one or more ingredients. The one or more ingredients may include any of the following: lip color composition, pigment composition, flavoring compositions, foundation composition, mascara composition, color gel compositions, cosmetic color stain composition, skin care compositions, moisturizing compositions, dental bleaching compositions, hair removal compositions, bronzer compositions, body shimmer compositions, hair shimmer/color compositions, hair styling foam compositions, dry shampoo composition, makeup remover compositions, nail polish compositions, nail polish remover compositions, acne treatment compositions, hair bleaching compositions, antibacterial compositions, deodorant compositions, perfume compositions, sun protection compositions, exfoliation compositions or anti-aging compositions shaving cream compositions, crème blush, crème rouge, skin crème, camouflage crème, massage crème, creme foundation, eye crème, rejuvenating eye crème, rejuvenating compositions, collagen crème, moisturizing crème, makeup removal crème, or the like. The one or more ingredients may include a lip color composition, a pigment composition, a flavoring composition or combinations thereof. The one or more ingredients may include any of the following: antibacterial compositions, moisturizing compositions, dental bleaching compositions, hair removal compositions, bronzer compositions, body shimmer compositions, hair shimmer/color compositions, makeup remover compositions, nail polish remover compositions, acne treatment compositions, hair bleaching compositions, deodorant compositions, perfume compositions, sun protection compositions, lip color composition, pigment composition, flavoring compositions, exfoliation compositions or anti-aging compositions. The one or more ingredients may consist essentially of a lip color or eye color composition.

The apparatus may dispense one or more cosmetics. The apparatus may dispense one or more sample size cosmetics. The apparatus may dispense one or more sample size cosmetics on a suitable cosmetic applicator. The apparatus may dispense one or more sample size cosmetics on a suitable cosmetic applicator adapted for the apparatus. The cosmetics may include lipstick, lip pencil, lip crayon, eye pencil, eye crayon, foundation stick or any combination thereof. The apparatus may dispense liquid cosmetics such as concealer, foundation and/or primer. The apparatus may dispense foundation. The apparatus may dispense concealer. The apparatus may dispense lip cosmetics such as lip gloss, liquid lipstick, lip tint, lip stain, lip shimmer. The apparatus may dispense mascara.

The substances may be delivered onto one or more types of substrates. The substrate may include a card. The card may be constructed any of the following: coated paper, uncoated paper, plastic, wood, metal, glass or mirror. The substrate may include a towelette. The towelette may be constructed of paper. The towelette may be constructed of fabric. The fabric may be disposable. The substrate may include a cotton swab. The substrate may include a brush. The substrate may include a disc. The substrate may include a glass slide. For example, the apparatus may dispense one or more of a flavoring composition, lip color composition and pigment composition onto a card. For example, the apparatus may dispense a fragrance or flavoring onto a card.

The substances may be delivered into one or more types of substrates. The substrate may include a container. The container may be any of the following: a product bottle, cup, tray, towelette, brush, cotton swab. The substrate may be constructed of any of the following: coated paper, uncoated paper, glass, plastic, acrylic, fabric, wood, metal, mirrored material. The substrate may include a pre-sealed cup. The pre-sealed cup may be comprised of plastic, paper, and the like with aluminum and/or plastic covering that may be punctured. The substance may be injected into material such as a towelette that is pretreated or pre-moistened. The towelette may be pretreated or pre-moistened with vitamins, preservatives, fragrance, saline, lotion, zinc oxide, sunscreen, and the like. The towelette may be biodegradable. One or more ingredients may dispensed into a mold for forming a unitary structure of a pigmented composition.

The method of delivery of the substrate onto or into which the sample is delivered may vary. The method for delivery of substrate may be automated. For example, such as by card feeder, paper feeder, roll of tape/paper dispenser, product bottle gravity drop, rotating carousel, loaded magazine or robotically placed. The method for delivery of substrate may be manual. For example, such as by individual feed. A robotic arm may assist in dispensing one or more ingredients. For example, a robotic arm may assists in dispensing one or more ingredients into a mold for forming a unitary structure.

The method of delivery of the substance onto or into the substrate may vary. The method for delivery may include actuator depressing syringes. The method for delivery may include spray. The method for delivery may include spray air aerosol. The method for delivery may include gravity drop.

The substrate may travel to receive the substance in proportioned amounts. The method of travel of a substrate to receive the substance in proportioned amounts may include one or movements. The movement direction may be linear, vertical and/or rotational. The mechanism for movement may include a conveyor belt or be robotically carried from location to location.

The method of delivery of the substrate including the sample to the customer may vary. The method of delivery may include one or more of the following: lift door, pull door entry, slide, robotic arm carousel, and elevator.

The apparatus may include one or more methods and/or devices for maintaining information regarding samples dispensed to the customers. The methods and/or devices may provide data analytics. The methods and/or devices for maintaining the data analytics may include mobile apps, network from dispenser and information generated, recorded and shared, social media resources, geometric location devices, beacon location devices and RFID.

The apparatus may provide a customized sample. The apparatus may provide a combination of proportioned material (liquid, powder, combination thereof) to be mixed/combined together manually and/or by an automated process to create a finished product for testing/sampling of the product for appearance, texture, taste, color, and the like for purchase at POS or for application at home, car, and/or other personal use.

The apparatus may provide a sample of a finished or completed product for purchase or use. One proportioned substance may be delivered to a substrate for testing/sampling to determine quality and preference for product by appearance, texture, taste, color, and the like for purchase at POS or for application at home, car, and/or other personal use.

The present teaching may include one or more unit play areas. A unit play area may include a mixing station unit. A unit play area may include a sample tester unit. The tester unit may incorporate a robotic arm for custom cosmetic dispensing at POS.

The present teachings further contemplate a two-system interconnected cosmetic dispensing apparatus. The apparatus may comprise a dispenser, a carrier including a plurality of mounts, a plurality of ingredient containers removably attached to the carrier via the plurality of mounts, vertical and horizontal translational components, one or more information retrieval devices, a user interface including a data interface adapted to store information on the one or more information retrieval devices, a transparent panel covering at least a portion of the dispensing apparatus. The one or more information retrieval device may be adapted to be maintained in the possession of a user. The dispenser may translate one selection into another compatible, corresponding and/or identical formulation to an additional apparatus that customizes a user's chosen formulation. A custom formulation from a first device may be communicated to a second device for production either in proximity to the first device or remotely. One device may be a 3-D, 4-D or other dimensional printer. The device that initially receive a custom formulation, prints the cosmetic for sample for the user onto a substrate and then further communicates with an additional cosmetic dispenser, translating one selection into another compatible, corresponding and/or identical formulation to an additional apparatus that customizes a user's chosen formulation.

The present teachings contemplate a hygienic custom sample tester. In one example, the sampling unit may have around 30 places for ingredients. The sampling unit may have a robotic arm, around 30 ingredient syringes, a conveyor belt to deliver samples, and a sample on a tester card. The sampling unit may fit inside existing footprint. The sampling unit may have: color, coverage, flavor dollops delivered to a test card. The sampling unit may have a delivery system that may be a conveyer belt to pick up area.

The present teachings contemplate an apparatus for hygienic sampling at point of sale for cosmetics. The cosmetics may include foundations, concealers, lip colors and mascaras. The apparatus may include one type of cosmetic, such as lip color, for sampling. The apparatus may include different colors and/or brands of lip color. The apparatus may include different types of cosmetics, such as lip gloss, mascara and concealer for sampling. The apparatus may include different colors and/or brands of the different types of cosmetics.

In one embodiment the apparatus includes lip gloss, mascara and concealer. The apparatus may include lip gloss brush applicators, mascara brush applicators and concealer brush applicators. There may be 20 applicators. There may be about 40 applicators. There may be about 10 to about 100 applicators for each type of cosmetic. For example, the apparatus may include one lip gloss, one mascara, one concealer, 20 lip gloss brush applicators, 20 mascara applicators and 20 concealer applicators.

The apparatus may include product bottles for testing. The dimensions of the product bottles for testing may be the same. The dimensions of the product bottles for testing may be different. The necks of the product bottles may be consistent. The container neck size may vary. The length of the product bottles may be the same. The length of the product bottles may be different.

The apparatus includes may include different brushes for testing. The apparatus may include lip gloss brush applicators. The apparatus may include mascara brush applicators. The apparatus may include concealer brush applicators. The brushes may be fitted with an adaptor to function properly in the testing apparatus.

The apparatus includes a customer interface design. The customer interface design may include an icon to represent each product to be tested by a customer. The customer interface design may include one lip gloss icon, one mascara icon and one concealer icon.

The apparatus may include a customer interface. The customer interface allows a customer to select position one, two or three for product sample testing. The customer may select one product to be tested (lip gloss, mascara, concealer). The brush that sits in the product container may be picked-up and vertically brought out of the product container. A small amount of product (e.g. lip gloss, mascara, concealer) is present on end of brush. The brush may be removed and disposed of by customer. The brush may be placed back on a picker to be sent back to waiting area for placement for future disposing. The apparatus may signal to a customer that product is ready for take away or pick-up. A new brush may be picked-up and placed into the product bottle that was just selected for testing in order to keep product from drying out.

The apparatus may include an administrative user interface. The administrative user interface may allow one or more of the following: homing of the device, reset page of device if unit should fail, count product tested per section, count brush positions until empty, count how many dips per bottle and notify administrator when product bottle needs to be changed out/replaced.

In one example, the apparatus delivers 60 brushes of product sample. For example, 20 brushes with lip gloss from position 1, 20 brushes with mascara at position 2 and 20 brushes of concealer at position 3. The apparatus maybe be refillable of product, such as lip gloss, mascara, and concealer, as well as sample disposable brushes for demonstration. Full product bottles are exchangeable with new product containers for refilling successfully. The product containers may be changed out. The sample brush holder area may be filled.

The apparatus may allow for tester brush magazine placement and removal. The apparatus may include software for administration use for refilling and for product delivery to customer. The apparatus may include a customer interface that may allow for a used brush to be delivered to drop off area for used brushes. The apparatus may include homing and delivery of 5 additional brushes with product per each bottle once the initial demonstration of 20 brush delivery is complete (60 brush delivery in total). The apparatus may include markings on the platform in order to successfully change out containers and brushes for successful placement for demonstration. The apparatus may provide product that is placed on each brush without excess. The apparatus may provide product that delivered to customer for pick up with a button on the customer interface. The apparatus may take a used brush and place it in a holding area for later disposal.

The apparatus may dispense the selected cosmetic sample within about one to about five minutes of user selection. The apparatus may dispense the selected cosmetic sample within about one minute of user selection. The apparatus may dispense the selected cosmetic sample within about two minutes of user selection. The apparatus may dispense the selected cosmetic sample within about three minutes of user selection. The apparatus may dispense the selected cosmetic sample at any suitable time after user selection. For example, the user may input data and select a cosmetic that is dispensed after an hour, two hours, three hours or even a day after user input. The apparatus may include a data interface adapted to store information on the one or more information retrieval devices regarding user input, cosmetic selection and/or dispensing of cosmetic samples.

The apparatus may provide for one or more of the following: correct placement of brush, correct pick-up of brush with product on end of brush, correct delivery of brush with product on end of brush for testing, correct delivery of brush with product on end of brush to waiting area, and correct refill of magazine of loaded brushes.

The present teachings contemplate an apparatus comprising a carrier including a plurality of mounts, a plurality of containers removably attached to the carrier via the plurality of mounts, vertical and horizontal translational components, one or more information retrieval devices, a user interface including a data interface adapted to store information on the one or more information retrieval devices and a transparent panel covering at least a portion of the dispensing apparatus. The one or more information retrieval device are adapted to be maintained in the possession of a user. The apparatus dispenses cosmetic samples based on user input.

The apparatus may dispense one or more sample size cosmetics. The apparatus may dispense one or more sample size cosmetics on one or more types of suitable cosmetic applicators. The apparatus may dispense one or more sample size cosmetics on a suitable cosmetic applicator adapted for the apparatus. The cosmetics dispensed may include, but are not limited to any combination of the following: concealer, foundation, lip gloss and mascara.

The apparatus of the present teachings includes a carrier. The carrier may be substantially rectangular in shape. The carrier may be any suitable shape. The carrier may include one or more panels. The carrier may include one or more side panels. The carrier may include one or more top panels. The one or more top panels may be attached at differing heights to the one or more side panels. The one or more top panels may include a plurality of openings. The carrier may include a bottom panel. The bottom panel of the carrier may be partially attached to a platform. The carrier may include plastic, glass, stainless steel or any other suitable material. The carrier may be comprised of a transparent plastic material. The carrier may be comprised of a combination of materials.

The carrier may include a plurality of mounts. The plurality of mounts may be arranged in one or more rows and/or columns. The mounts may vary in shape and/or size. The mounts may be the same shape and/or size. The plurality of mounts may hold containers. The containers may include a bottle portion and a cap portion. The containers may include removably attached caps with an attached cosmetic applicator. The carrier may include separate sections. The carrier may include a section for holding one or more containers with removably attached caps with an attached cosmetic applicator. The carrier may include a section for holding one or more caps with an attached cosmetic applicator. The carrier may hold the containers including removably attached caps with an attached cosmetic applicator and/or caps with an attached cosmetic applicator so that they are suspended in air, enclosed in mount wells or both.

Items may be held in the plurality of mounts on an angle. Items held on the carrier may exist on a common plane or on a plurality of planes. The arrangement of the containers and/or caps with attached cosmetic applicators on the carrier may vary. Suitable arrangements include patterns such as a radial disposition or linear disposition. In one example, the containers and/or caps with attached cosmetic applicators are arranged in a linear fashion in columns and/or rows. However, non-pattern arrangements are also contemplated.

The apparatus of the present teachings includes one or more containers. The containers may vary in shape and/or size. One or more of the containers may be at least partially transparent for revealing contents. The containers may hold cosmetics. The containers may hold the same category (e.g. mascara) of cosmetic. The containers may hold the different categories (e.g. mascara, concealer, lip gloss) of cosmetics. The containers may hold one or more ingredients for cosmetics. The containers may include plastic, glass, stainless steel or some other suitable material. The containers may be selected from the group consisting of: bags, cartridges, bottles, vials, tubes, barrels, wells in a block of material, cans or any combination thereof. The containers may be disposable or re-useable. The containers may include a bottle portion and a removably attached cap portion. The cap portion may include an attached cosmetic applicator. The bottle portion of the container may be the same bottle as the prepackaged cosmetic container.

The containers may include a removably connected cap. The caps may vary in shape and/or size. The cap may include a cosmetic applicator. The cosmetic applicator may be attached to the cap. The cosmetic applicator may vary in shape and/or size. The applicator may be a cosmetic applicator wand that includes a top portion that is attached to the interior bottom portion of the cap and a bottom portion that is attached to any suitable component (e.g. brush) for cosmetic application.

The cosmetic applicator may be adapted for a particular type of cosmetic. The cosmetic applicator may include bristles. The cosmetic applicator may include a sponge-tip. The cosmetic applicator may be a doe foot applicator.

The apparatus may include one more containers with a removably attached cap with attached cosmetic applicator. The apparatus may include one or more caps with attached cosmetic applicator that are unattached to the one or more containers. The apparatus may include one type of cosmetic applicator. The apparatus may include multiple types of cosmetic applicators.

The cap with attached cosmetic applicator may be adapted to fit with the gripping portion of a robotic arm assembly. For example, the top portion of the cap may include a recess or bore whereby the gripping portion removably attaches to the top portion of the cap. The recess or bore may not go all the way through the cap. The recess or bore may be any suitable shape. For example, the recess or bore may be circular. The recess or bore may include grooves. The recess or bore may be threaded. The recess or bore of the cap is such that the gripping portion of a robotic arm assembly may lift the cap and attached cosmetic applicator up, out and away from the bottle portion of the container. The cap with attached cosmetic applicator stays securely attached to the gripping portion until release and/or removal.

The apparatus may include a control housing assembly. The control housing assembly may include a housing cover. The housing cover may be a suitable molded plastic configuration. The control housing assembly may include electrical components. The control housing assembly may include computer components. The control housing assembly may include one or more hardware components of a computer system. The control housing assembly may be connected to one or more components of a computer system.

The housing cover may include openings for allowing access to electrical power connections, data communication ports or the like. The control housing assembly may be communication with the robotic arm assembly. The control housing assembly may be in communication with one or more components of the computer system. The control housing assembly may be in communication with the computer system. The communication between the control housing assembly and other parts of the apparatus may be wireless, non-wireless or both.

The apparatus may be connected to any suitable power source. The apparatus may be connected to an electrical power source. The apparatus or any portion of the apparatus may include an actuator. The apparatus may be motorized. The apparatus may include one or more motors. The motor may be a step motor. The motor may be a step motor with a microstep drive. The step motor with microstep drive may include a DC power supply suitable for the motor and current resistor set. The apparatus may be battery operated. The apparatus may include one or more batteries. The apparatus may be operated manually.

The apparatus may include electrical circuitry adapted to signaly interface with one or more components of the apparatus. The electrical circuitry may include one or more electrically conductive paths (e.g., hard-wired cables, wires, traces, etc.). The apparatus may include at least one printed circuit board ("PCB"). The conductive paths may be part of the at least one PCB. For example, such as a PCB including conductive paths on two or more surfaces in electrical communication with each other through conductive vias.

The PCB may be single sided, double sided or multi-layered. The PCB may be a double sided board. The PCB may be 4 layer board. The PCB board may include up to seven layers. The PCB layers may include one or more of the following: silkscreen, top solder mask, top copper, inner copper ground plane, inner copper power plane, bottom copper and bottom solder mask.

The electrical circuitry for operations of the apparatus may be carried on at least one PCB. The PCB may also carry a controller. The PCB may be adapted to include a connector to accept power and ground lines from one or more power supplies. The PCB may include one or more fuses to help prevent damage to electronic components. The PCB may be adapted to include suitable elements, for example a plurality of capacitors, for helping to minimize fluctuations and noise in the incoming power supply. Suitable elements, for example diodes, may be employed to selectively direct the flow of current. The present teachings may include may include one or more of the following: connectors, integrated circuits, batteries, relays, motors, resistors, capacitors, inductors, transistors, diodes, electrolytic caps, LEDS, switches, buttons, mounting holes, and heat sinks.

The electrical circuitry may include a plurality of circuit portions that collectively define a part of or a complete single circuit. The electrical circuitry may include a plurality of circuit portions that collectively define a plurality of circuits. A plurality of circuits may be independent circuits, which nonetheless may be configured to function cooperatively with each other to perform the recited functions of the present teachings. At least a portion of the electrical circuitry may be enclosed by the housing control assembly.

The apparatus may include a motherboard as a main PCB. The motherboard may allow communication between a computer system and provide connectors for other peripherals. The peripherals may include input devices (e.g. keyboards or mice), output devices which provide output to the user from the computer system (e.g. monitors or printers) or input/output devices which provide both functions (e.g. touchscreen).

The apparatus includes a user interface that facilitates the selection of one or more cosmetic samples by a user. The apparatus may include an interactive computer system. A user may communicate with the apparatus via the computer system. The user may be the consumer, a sales associate, a technician or any other individual. A user may input data regarding one or more cosmetics. A user may input data regarding personal information and/or preferences. A user may input data regarding selection of one or more cosmetics. The data input by the user is then output by the computer system to one or more controllers and a cosmetic sample is dispensed based on the user input data. The computer system may be programmed with one or more programming languages designed to communicate instructions to the computer system. The computer system may include suitable memory components.

The computer system may include one or more information retrieval devices. For example, the one or more information retrieval devices may include radio frequency identification device, wearable technology, mobile device (app), thumb print recognition, facial recognition (biometrics), location technologies such as beacon, geometric, and the like, a photograph taken at delivery system and a photograph uploaded to dispenser from a computer or mobile device. The one or more informational retrieval devices may store information relating to the amount of products purchased, consumed, or dispensed from the dispensing apparatus. The one or more information retrieval devices may be configured to make recommendations of ingredients to be dispensed from the dispensing apparatus based upon information stored in the one or more informational retrieval devices. The apparatus may transfer a product to a user after a product is ordered via mobile device, online, or after a user has moved away from the apparatus and then returned to the apparatus after a lapsed period of time. A product may be transferred to a user once a signal is received from the information retrieval device.

The computer system of the present teachings may be in communication with one or more peripheral devices. The peripheral device may be an input device. The peripheral device may be an output device. The peripheral device may be both an input/output device. The apparatus may include input peripherals selected from the group consisting of: keyboards, computer mice, tablets, touchscreens, barcode readers, image scanners, microphones, webcams, game controllers, light pens, and digital cameras. The apparatus may include output peripherals selected from the group consisting of: computer displays, printers, projectors, and computer speakers.

The functions performed by the above input and output devices may be divided among multiple devices or integrated into a single device. The input devices may directly communicate with the dispensing apparatus or indirectly communicate via an additional medium (e.g., computer). Each of the respective components may be controlled independently, through its own control system, or by way of one or more computers.

The apparatus locates the desired cosmetic based upon user input. The apparatus may include vertical and horizontal translational components. The vertical and horizontal translational components may comprise a robotic arm assembly.

In one example, the apparatus includes a robotic arm assembly. The robotic arm assembly may include one or more programmable arm assemblies. The robotic arm assembly may be programmed to locate the proper location and/or cause dispensing from the items held in the plurality of mounts on the carrier.

The robotic arm assembly may include one or more arm assemblies. The robotic arm assembly may include a first arm assembly. The robotic arm assembly may include a second arm assembly. The robotic arm assembly may include a third arm assembly. The robotic arm assembly may be comprised of three arm assemblies. At least a portion of the robotic assembly robotic arm assembly may move along one or more axes. Movement of the robotic arm assembly may be simultaneous. Movement of the robotic arm assembly may be consecutive.

At least a portion of the robotic assembly may move along the x, y and z axis. At least a portion of the robotic assembly may move along any combination of the following: x, y and z axis. The movement paths may be one or more of the following: translational, rotational, linear or non-linear. At least a portion of the robotic assembly may be stationary.

Movement of robotic assembly or any portion of the apparatus may be achieved using any suitable drive mechanism. A drive mechanism may include pneumatic, hydraulic, electrical or mechanical drive means. The robotic assembly may include one or more drive members. The one or more drive members may be any suitable shape. For example, the drive member may be a drive shaft. For example, the drive member may be a drive belt.

A robotic arm assembly may be comprised of one or more arm assemblies. An arm assembly may include a motor, a drive member, a sliding member and an arm. The motor may move the drive member in a first direction. The motor may move the drive member in an opposing second direction. The drive member may be threaded. The drive member may be non-threaded. The drive member may move rotationally. The rotation of the drive member may cause movement of the sliding member. The sliding member may be slidingly engaged with the arm. The arm may be stationary. The sliding member may move linearly along the arm in a first direction. The sliding member may move linearly along the arm in second direction opposing the first direction. The sliding member may be include a gripping portion. The gripping portion may move in same direction as the sliding member.

In one example, the robotic arm assembly includes a first arm assembly, a second arm assembly and a third arm assembly with a gripping portion. The robotic arm assembly moves towards the desired cosmetic container with removably attached cap including an attached cosmetic applicator. At least a portion of the robotic assembly may move along an x-axis and/or z-axis along the carrier to locate the cosmetic container including the desired cosmetic.

At least a portion of the robotic arm assembly with gripping portion moves downward along a y-axis to contact the cap of the desired cosmetic container held in a mount of the carrier with the gripping portion. The gripping portion of the robotic assembly makes contact with the top portion of the cap. The gripping portion of the robotic assembly is adapted to fit with the top portion of the cap. The top exterior portion of the cap of the container may include a recess or bore. The top exterior portion of the cap of the container may include grooves. The top exterior portion of the cap of the container may be threaded. The gripping portion may be substantially planar, include grooves or both. The gripping portion may be threaded. At least a portion of the robotic arm assembly lifts the cap with the attached cosmetic applicator upwards along a y-axis and out of the bottle portion of the container.

At least a portion of the robotic arm assembly including the gripping portion attached to the cap with attached cosmetic applicator including a cosmetic sample moves towards a designated location. For example, towards an individual positioned near a selected location. The cap with attached cosmetic applicator including a cosmetic sample stays securely attached to the gripping portion until release and/or removal. For example, an individual may remove the cap with attached cosmetic applicator including a cosmetic sample by pulling it away from the gripping portion.

After release and/or removal of the cap with attached cosmetic applicator including a cosmetic sample, at least a portion of the robotic arm assembly moves away from the designated location. For example, away from the individual towards the carrier with the plurality of mounts. The apparatus locates a cap with an attached cosmetic applicator that corresponds to the previously dispensed cosmetic sample. For example, if the carrier includes the following: containers including mascara, lip gloss, concealer, caps with attached mascara applicators and caps with attached lip gloss/concealer applicators, and the previously dispensed cosmetic sample was mascara, the apparatus will locate a cap with an attached mascara applicator from the plurality of mounts in the carrier. The mounts including the mascara applicator may be located in one or more rows and/or columns near the mascara container. At least a portion of the robotic arm assembly with gripping portion then moves downward along a y-axis to contact the cap with attached cosmetic applicator corresponding to the type of cosmetic sample previously dispensed. At least a portion of the robotic arm assembly moves upwards along the y-axis and lifts the cap with the attached cosmetic applicator upwards and out of the mount of the carrier.

The apparatus locates the bottle portion of the container of the previously dispensed cosmetic. For example, if the previously dispensed cosmetic was mascara, the apparatus locates the uncovered mascara bottle. At least a portion of the robotic arm assembly with the gripping portion securely attached to the cap with an attached cosmetic applicator moves along an x-axis and/or z-axis towards the mount of the carrier holding the bottle of the previously dispensed cosmetic. At least a portion of the robotic arm assembly with the gripping portion securely attached to a cap with an attached cosmetic applicator moves downward along a y-axis and into the bottle of the previously dispensed cosmetic. The cap with an attached cosmetic applicator is released from the gripping portion so that the cosmetic applicator portion is inside the bottle and the attached cap covers the bottle. At least a portion of the robotic arm assembly with the gripping portion moves upward along a y-axis away from the cosmetic container.

The apparatus may provide additional cosmetic samples depending on user input. The apparatus may provide another sample from the same bottle as the previous cosmetic sample. The apparatus may provide another sample which is from the same category as the previous sample. For example, if the previously provided sample was mascara, the apparatus may provide a sample of a different mascara. The apparatus may provide another sample which is from a different category as the previous sample. For example, if the previously provided sample was mascara, the apparatus may provide a sample of lip gloss. The apparatus may provide samples of one or more cosmetics. The cosmetics may vary by any of the following: category of cosmetic, type of cosmetic applicator, color, brand, claimed feature.

The apparatus may be for use at a site where the point of sale is the same as the point of dispensing. The apparatus of the present teachings may be separated into two or more modular components. The apparatus may be integrated into a general housing assembly. The apparatus may include one or more transparent panels. The one or more transparent panels may cover one more modular components of the apparatus. The general housing assembly may include one or more transparent panels. The one or more transparent panels may allow consumers to view the moving parts associated with the apparatus and operation. Consumers are thereby is ensured that they are receiving a hygienic cosmetic sample and that has not been repeatedly handled by the general public. The apparatus may be used in one or more locations such as at retail point of sale, in home, in hotel, in automobile and in airplane. The apparatus may also provide any of the following: attract consumers, entertain and provide an interactive user experience.

28.

FIG. 1 depicts a perspective view of one example of the present teachings. An apparatus 100 is depicted including vertical and horizontal translational components comprised of a robotic arm assembly 110, a carrier 120, a control housing assembly 140 and a user interface 150.

The robotic arm assembly 110 includes multiple arm assemblies. The first arm assembly 512 includes a first arm 112, a first motor 212, a first sliding member 312 and a first driving member 412. The second arm assembly 514 includes a second arm 114, a second motor 214, a second sliding member 314 and a second driving member 414. The third arm assembly 516 includes a third arm 116, a third motor 216, a third sliding member 316 with a gripping portion 318 and a third driving member 416. The robotic arm assembly 110 is partially connected to a platform 124. The platform 124 is also partially connected to the carrier 120.

The carrier 120 includes a plurality of mounts 122. The plurality of mounts 122 hold one or more containers 130. The containers 130 may include one or more type of cosmetics (e.g. mascara, lip gloss and concealer). The container 130 includes a bottle portion 132 and a cap portion 134. The cap portion 134 includes an attached cosmetic applicator 136. The top portion of the cap 134 includes a bore 138 which does not extend all the way through the cap 134. The plurality of mounts 122 hold one or more additional caps 134 with attached cosmetic applicators 136. The additional caps 134 with attached cosmetic applicators 136 may include more than one type of applicator (e.g. mascara and lip gloss/concealer applicators). The gripping portion 318 of the sliding member 316 removably attaches to the bore 138 of the cap 134.

At least a portion of the robotic arm assembly 110 moves along the x, y and z axes. At least a portion of the second arm assembly 514 and third arm assembly 516 move along the x axis. The movement is along the length of the carrier 120 along the x-axis. At least a portion of the third arm assembly 516 moves along the y-axis. The movement is from a location above the carrier 120 to a point of contact between the gripping portion 318 of the third arm assembly 516 and a cap 134. At least a portion of the third arm assembly 516 including the gripping portion 318 moves along the z-axis. Movement is along the width of the carrier 120 along the z-axis.

The first arm assembly 512 includes a first motor 212. The first motor 212 causes rotational movement of the first drive member 412. The first drive member 412 is engaged with the first sliding member 312. Rotation of the first drive member 412 in one direction results in the first sliding member 312 moving linearly along the x-axis in a first direction. Rotation of the first drive member 412 in an opposing direction results in the first sliding member 312 moving linearly along the x-axis in a second direction opposing the first direction. The first sliding member 312 is slidingly engaged with the first arm 112. The first arm 112 is stationary relative to the platform 124 and generally parallel to the first drive member 412. The first arm 112 is generally parallel to the x-axis. At least a portion of the first sliding member 312 is affixed to the second arm 114, the second motor 214, or both. Movement of the first sliding member 312 along either direction of the x-axis causes movement of the second arm assembly 514, the third arm assembly 516 and/or the gripping portion 318 along the x-axis.

The second arm assembly 514 includes a second motor 214. The second motor 214 causes rotational movement of the second drive member 414. The second drive member 414 is engaged with the second sliding member 314. Rotation of the second drive member 414 in one direction results in the second sliding member 314 moving linearly along the y-axis in a first direction. Rotation of the drive member 414 in an opposing direction results in the second sliding member 314 moving linearly along the y-axis in a second direction opposing the first direction. The second sliding member 314 is slidingly engaged with the second arm 114. The second arm 114 is vertically stationary and generally parallel to the second drive member 414. At least a portion of the second sliding member 314 is affixed to the third arm 116, the third motor 216, or both. Movement of the second sliding member 314 along either direction of the y-axis causes movement the third arm assembly 516 and/or the gripping portion 318 along the y-axis.

The third arm assembly 516 includes a third motor 216. The third motor 216 causes rotational movement of the third drive member 416. The third drive member 416 is engaged with the third sliding member 316. Rotation of the third drive member 416 in one direction results in the third sliding member 316 moving linearly along the z-axis in a first direction. Rotation of the third drive member 416 in an opposing direction results in the third sliding member 316 moving linearly along the z-axis in a second direction opposing the first direction. The third sliding member 316 is slidingly engaged with the third arm 116. The third arm 116 is generally parallel to the third drive member 416. At least a portion of the third sliding member 316 is affixed to at least a portion of the gripping portion 318. Movement of the third sliding member 316 along either direction of the z-axis causes movement of the gripping portion 318 along the z-axis.

The robotic arm assembly 110 is connected to a control housing assembly 140. The control housing assembly 140 includes one or more electrical components 142 and one or more computer hardware components 144 of the computer system 160. The control housing assembly 140 may be connected to a power supply (not shown). The control housing assembly 140 is connected to the user interface 150 of the computer system.

Figure 2:
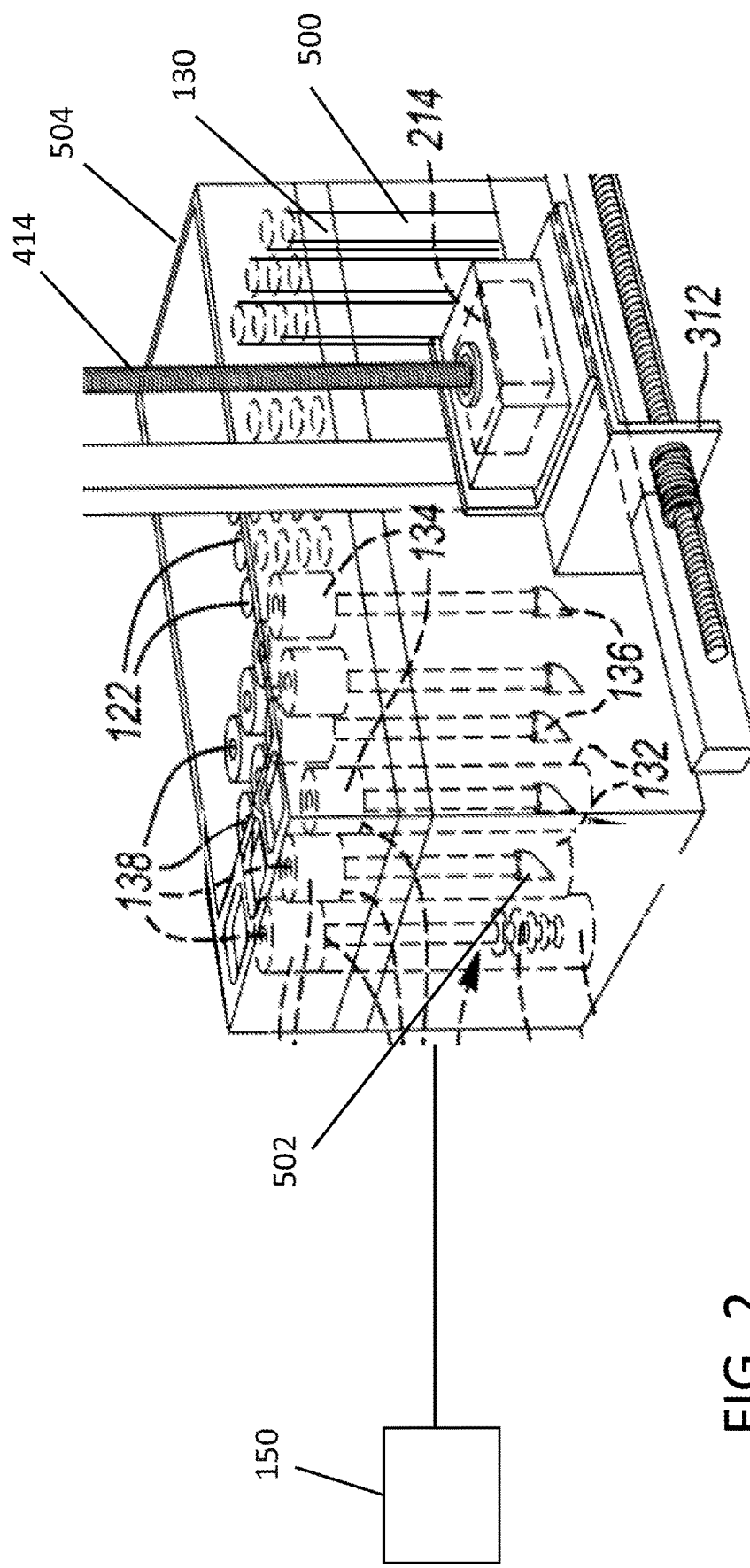

As shown for example in FIG. 2, the apparatus comprises a carrier 120 including a plurality of mounts 122; and a plurality of containers 130 removably attached to the carrier 120 via the plurality of mounts 122, each container containing a sample material 500, a plurality of horizontal translational components including a robotic arm 110, an applicator 136 for locating within at least one of the plurality of containers 130 so that a portion of sample material 500 is located from within the at least one container 130 and onto the applicator 136 to produce a hygienic sample 502, whereby the robotic arm moves in a horizontal direction to carry an applicator 136 from one portion of the device that stores the applicators 136 to the one or more containers 130 that are horizontally remote from the portion of the device that stores the applicators, a panel system 504 for covering at least a portion of the apparatus for ensuring non-contamination of the hygienic sample 502, a user interface 150; and a rotational movement of a drive member 414 for moving one or more of the container 130, the applicator 136, or the hygienic sample 502. The apparatus is adapted to provide multiple cosmetic samples based on user input, the same container 130 can receive a new applicator multiple times to provide multiple hygienic samples 502, the containers contain more than one type of cosmetic; and wherein the apparatus dispenses the hygienic sample according to user input.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for ail purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. An apparatus comprising:
   a) a carrier including:
   i) a plurality of mounts; and
   ii) a plurality of containers removably attached to the carrier via the plurality of mounts, each container containing a sample material;
   b) a plurality of horizontal translational components including a robotic arm;
   c) an applicator for locating within at least one of the plurality of containers so that a portion of sample material is located from within the at least one container and onto the applicator to produce a hygienic sample;
   d) side panels of the carrier for ensuring non-contamination of the hygienic sample;
   e) a user interface; and
   a rotational movement of a drive member for moving one or more of the container, the applicator, or the hygienic sample;
   wherein the apparatus is adapted to provide multiple hygienic samples based on user input, each of the plurality of containers can receive multiple new applicators to provide the multiple hygienic samples, the plurality of containers contain more than one type of cosmetic; and
   Wherein the apparatus dispenses the hygienic sample according to the user input.

2. The apparatus of claim 1, including vertical translational components.

3. The apparatus of claim 1, including an arm and a motor.

4. The apparatus of claim 1, wherein the horizontal translational components include an arm.

5. The apparatus of claim 4, wherein the horizontal translational component moves along one or more axis.

6. The apparatus of claim 1, wherein the carrier is at least partially connected to a platform.

7. The apparatus of claim 4, wherein the carrier includes one or more panels.

8. The apparatus of claim 6, wherein the carrier is substantially rectangular in shape.

9. The apparatus of claim 1, wherein the plurality of mounts are arranged in one or more rows and/or columns.

10. The apparatus of claim 9, wherein the plurality of containers include a bottle portion and a cap portion.

11. The apparatus of claim 1, including a plurality of caps with attached cosmetic applicators removably attached to the carrier via the plurality of mounts.

12. The apparatus of claim 1, including a plurality of caps with attached cosmetic applicators removably attached to the carrier via the plurality of mounts, wherein the attached cosmetic applicators include mascara brushes and lip gloss/concealer applicators.

13. The apparatus of claim 4 including a plurality of caps with attached cosmetic applicators removably attached to the carrier via the plurality of mounts, wherein the plurality of caps with attached cosmetic applicators are adapted to fit with a gripping portion of a robotic arm assembly.

14. The apparatus of claim 11, including a control housing assembly including electrical components and computer components.

15. The apparatus of claim 1, including a control housing assembly including electrical components and computer components connected to a robotic arm assembly.

16. The apparatus of claim 1, wherein the applicator comprises one or more of coated paper, uncoated paper, glass, plastic, acrylic, fabric, wood, metal, mirrored material, or combinations thereof.

17. The apparatus of claim 16, wherein the hygienic sample comprises a liquid, solid, powder, gel, or a combination thereof.

\* \* \* \* \*